(12) United States Patent
Huang et al.

(10) Patent No.: US 8,144,143 B2
(45) Date of Patent: Mar. 27, 2012

(54) LIQUID CRYSTAL DISPLAY AND CHARGE PUMP THEREOF

(75) Inventors: Hsien-Ting Huang, Tainan County (TW); Yaw-Guang Chang, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 461 days.

(21) Appl. No.: 12/508,603

(22) Filed: Jul. 24, 2009

(65) Prior Publication Data

US 2011/0018851 A1 Jan. 27, 2011

(51) Int. Cl.
*G09G 5/00* (2006.01)
(52) U.S. Cl. ............... 345/211; 345/87; 327/536
(58) Field of Classification Search ............ 345/87–103, 345/204, 211–215; 327/536; 257/299
See application file for complete search history.

(56) References Cited

U.S. PATENT DOCUMENTS

| | | | | |
|---|---|---|---|---|
| 7,224,591 B2* | 5/2007 | Kaishita et al. | ................ | 363/60 |
| 7,271,642 B2* | 9/2007 | Chen et al. | .................... | 327/514 |
| 7,724,551 B2* | 5/2010 | Yanagida et al. | ............... | 363/60 |
| 7,764,525 B2* | 7/2010 | Hsieh et al. | .................... | 363/60 |
| 7,821,325 B2* | 10/2010 | Chaoui | ......................... | 327/536 |

* cited by examiner

*Primary Examiner* — Lun-Yi Lao
*Assistant Examiner* — Tom Sheng
(74) *Attorney, Agent, or Firm* — Thomas|Kayden

(57) ABSTRACT

A charge pump with limited peak current and improved application flexibility and an LCD having the same. The charge pump has more than three switches in a charge path and more than three switches in a pump path. Furthermore, the charge pump has a voltage detector detecting voltage of the output terminal of the charge pump and a charge pump controller controlling the switches based on the detected voltage. According to the detected voltage, the charge pump controller determines the number of turning-on switches in the charge path and determines the number of turning-on switches in the pump path.

20 Claims, 8 Drawing Sheets

LIQUID CRYSTAL DISPLAY AND CHARGE PUMP THEREOF

BACKGROUND OF THE INVENTION

1. Field of the Invention

The present invention relates to charge pumps and liquid crystal displays (LCDs) having charge pumps.

2. Description of the Related Art

FIG. 1 depicts a liquid crystal display (LCD) 100 which comprises a display area 102 and an LCD driver 104. The LCD driver 104 typically receives a reference voltage VCI from an exterior source to generate positive and negative voltages (hereinafter VSP and VSN) for driving the display area 102. Generally, a charge pump is required in the LCD driver 104 to generate the voltage VSP and VSN.

However, conventional charge pumps usually have poor application flexibility. The generated voltages VSP and VSN are limited by the structure of the charge pump. The circuit of the charge pump has to be redesigned when target values of the voltages VSP and VSN are changed.

Furthermore, the generated voltages VSP and VSN may deviate from their target value because of the load current.

Also, in some cases, the charge pump may cause considerable peak current in its charge or pump periods. The undesired peak current increases power consumption and hinders LCD application in portable consumer electronic products.

To solve at least the aforementioned drawbacks, novel charge pump techniques are called for.

BRIEF SUMMARY OF THE INVENTION

The invention discloses charge pumps with limited peak current and improved application flexibility. The charge pump comprises an output terminal, a capacitor, a plurality of first switches, a plurality of second switches, a plurality of third switches, a plurality of fourth switches, a voltage detector and a charge pump controller.

The capacitor has a first terminal and a second terminal. The plurality of first switches are coupled in parallel between a first reference voltage and the first terminal of the capacitor. The plurality of second switches are coupled in parallel between a second reference voltage and a first node that is coupled to the second terminal of the capacitor. The plurality of third switches are coupled in parallel between the first terminal of the capacitor and the output terminal. The plurality of fourth switches are coupled in parallel between a third reference voltage and a second node that is coupled to the second terminal of the capacitor.

The voltage detector detects voltage value of the output terminal. The charge pump controller controls the first, second, third and fourth switches. In a charge period, the charge pump controller turns off all third and fourth switches and selectively turns on the first and second switches to generate a charge path for the capacitor, wherein the selection of the turning-on switches is based on the detected voltage value of the output terminal. In a pump period, the charge pump controller turns off all first and second switches and selectively turns on the third and fourth switches to generate a pump path for the capacitor, wherein the selection of the turning-on switches is based on the detected voltage value of the output terminal.

In an exemplary embodiment of the charge pumps of the invention, the charge pump controller increases the number of turning-on switches when the detected voltage value of the output terminal is lower than a target value. Furthermore, the charge pump controller may decrease the number of turning-on switches when the detected voltage value of the output terminal is greater than the target value.

The invention further discloses liquid crystal displays having charge pumps of the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
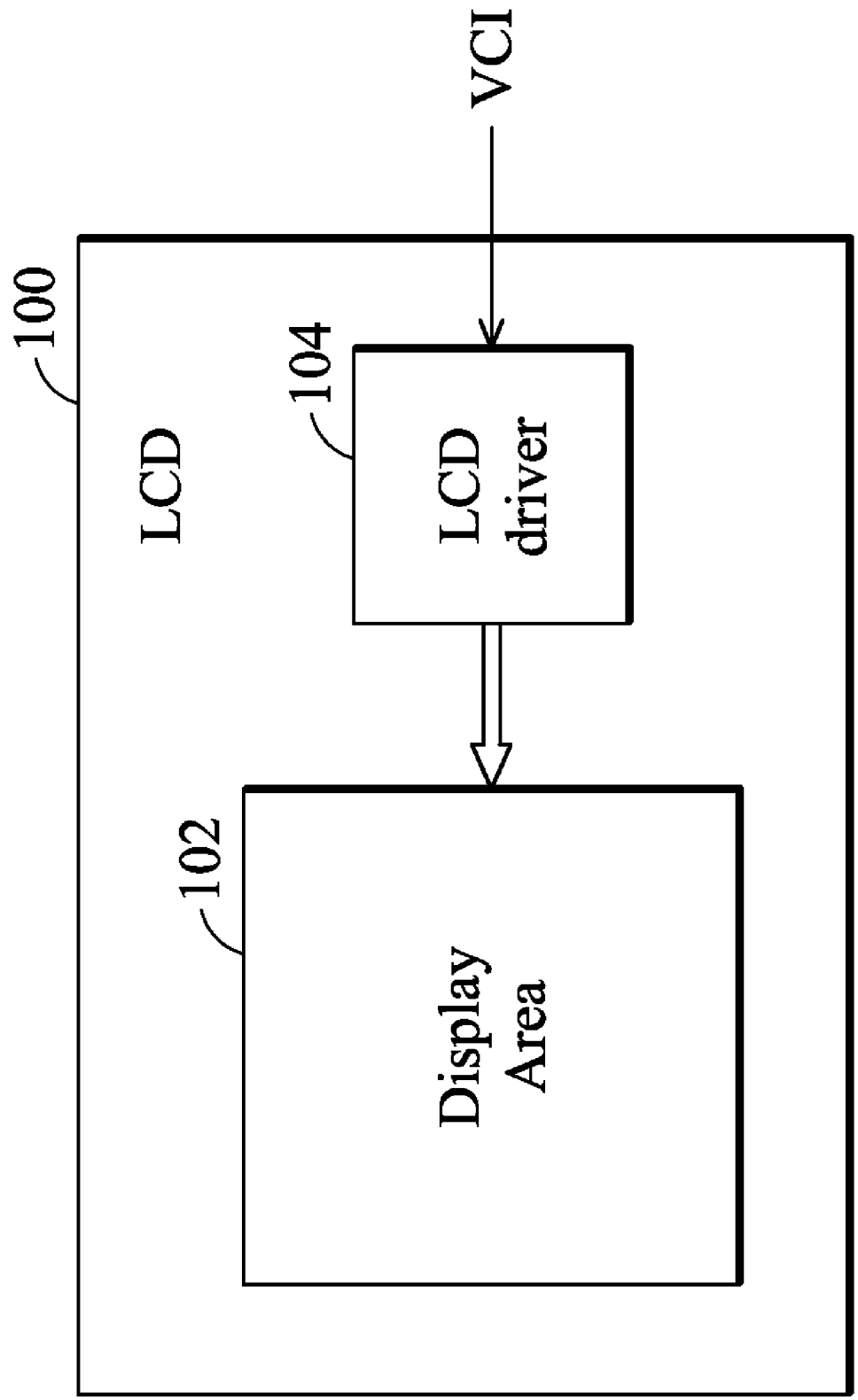
FIG. 1 depicts a conventional liquid crystal display.
Figure 2:
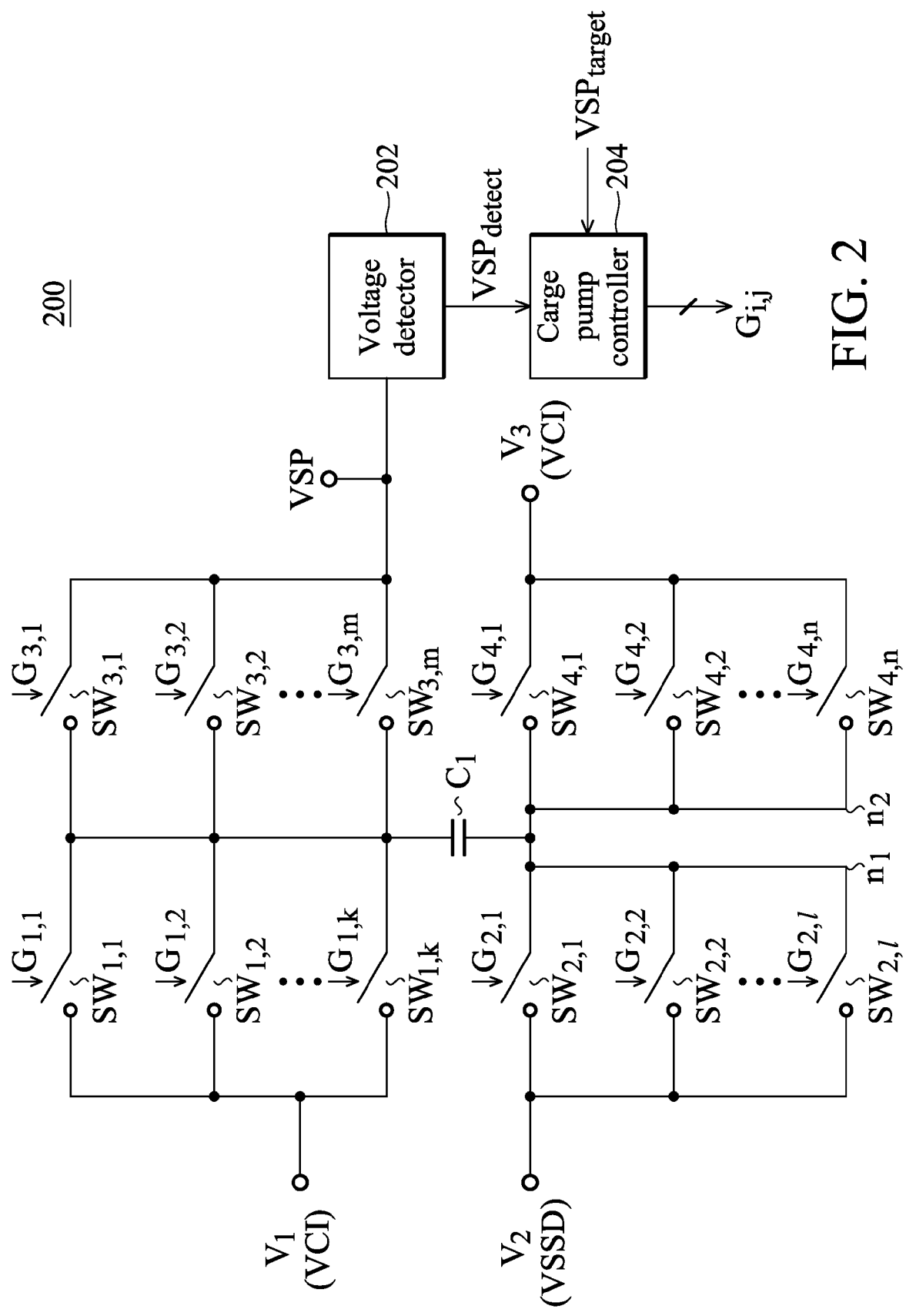
FIG. 2 depicts an exemplary embodiment of the charge pumps of the invention.

FIG. 2 depicts an exemplary embodiment of the charge pumps of the invention. Charge pump 200 comprises an output terminal outputting a voltage value VSP, a capacitor $C_1$, a plurality of first switches $SW_{1,1} \ldots SW_{1,k}$, a plurality of second switches $SW_{2,1} \ldots SW_{2,l}$, a plurality of third switches $SW_{3,1} \ldots SW_{3,m}$, and a plurality of fourth switches $SW_{4,1} \ldots SW_{4,n}$, a voltage detector 202 and a charge pump controller 204. The switches may be realized by metal-oxide-semiconductor (MOS) transistors. The first switches $SW_{1,1} \ldots SW_{1,k}$ are coupled in parallel between a first reference voltage $V_1$ and a first terminal of the capacitor $C_1$, and are controlled by control signals $G_{1,1} \ldots G_{1,k}$, respectively. The second switches $SW_{2,1} \ldots SW_{2,l}$ are coupled in parallel between a second reference voltage $V_2$ and a first node $n_1$, and are controlled by control signals $G_{2,1} \ldots G_{2,l}$, respectively. The first node $n_1$ is coupled to a second terminal of the capacitor $C_1$. The third switches $SW_{3,1} \ldots SW_{3,m}$ are coupled in parallel between the first terminal of the capacitor $C_1$ and the output terminal (VSP), and are controlled by control signals $G_{3,1} \ldots G_{3,m}$, respectively. The fourth switches $SW_{4,1} \ldots SW_{4,n}$ are coupled in parallel between a third reference voltage $V_3$ and a second node $n_2$, and are controlled by control signals $G_{4,1} \ldots G_{4,n}$, respectively. The second node $n_2$ is coupled to the second terminal of the capacitor $C_1$.

The voltage detector 202 detects voltage value of the output terminal (detecting VSP). The charge pump controller 204 receives the detected value $VSP_{detect}$ and a target value $VSP_{target}$ of the output terminal, and generates the control signals $G_{1,1} \ldots G_{1,k}, G_{2,1} \ldots G_{2,l}, G_{3,1} \ldots G_{3,m}, G_{4,1} \ldots G_{4,n}$ (symbolized by $G_{i,j}$) to control the switches $SW_{1,1} \ldots SW_{1,k}, SW_{2,1} \ldots SW_{2,l}, SW_{3,1} \ldots SW_{3,m}, SW_{4,1} \ldots SW_{4,n}$. In a charge period, the charge pump controller 204 turns off all third and fourth switches $SW_{3,1} \ldots SW_{3,m}$ and $SW_{4,1} \ldots SW_{4,n}$ and selectively turns on the first and second switches $SW_{1,1} \ldots SW_{1,k}$ and $SW_{2,1} \ldots SW_{2,l}$ to generate a charge path to charge the capacitor $C_1$ by the first and second reference voltages $V_1$ and $V_2$, wherein the selection of turning-on switches is dependent on the detected voltage value $VSP_{detect}$. In a pump period, the charge pump controller 204 turns off all first and second switches $SW_{1,1} \ldots SW_{1,k}$ and $SW_{2,1} \ldots SW_{2,l}$ and selectively turns on the third and fourth switches $SW_{3,1} \ldots SW_{3,m}$ and $SW_{4,1} \ldots SW_{4,n}$ to generate a pump path to pump the voltage value of the output terminal by the third reference voltage $V_3$ and the voltage level stored in the capacitor $C_1$, wherein the selection of the turning-on switches is dependent on the detected voltage value $VSP_{detect}$.

Figure 3A:
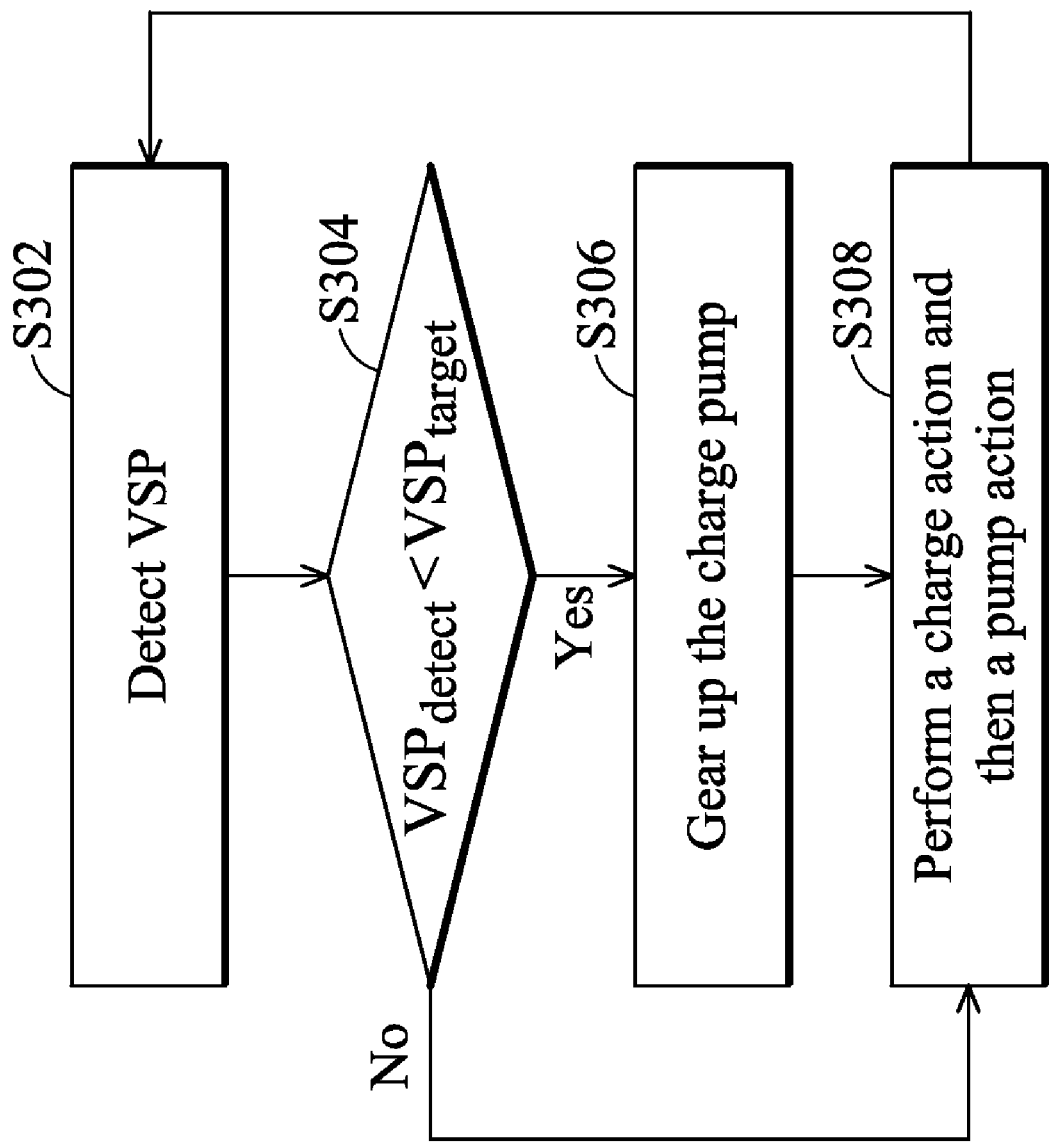
FIGS. 3A and 3B depicts flowcharts depicting the operation of the voltage detector 202 and the charge pump controller 204.
Figure 3B:
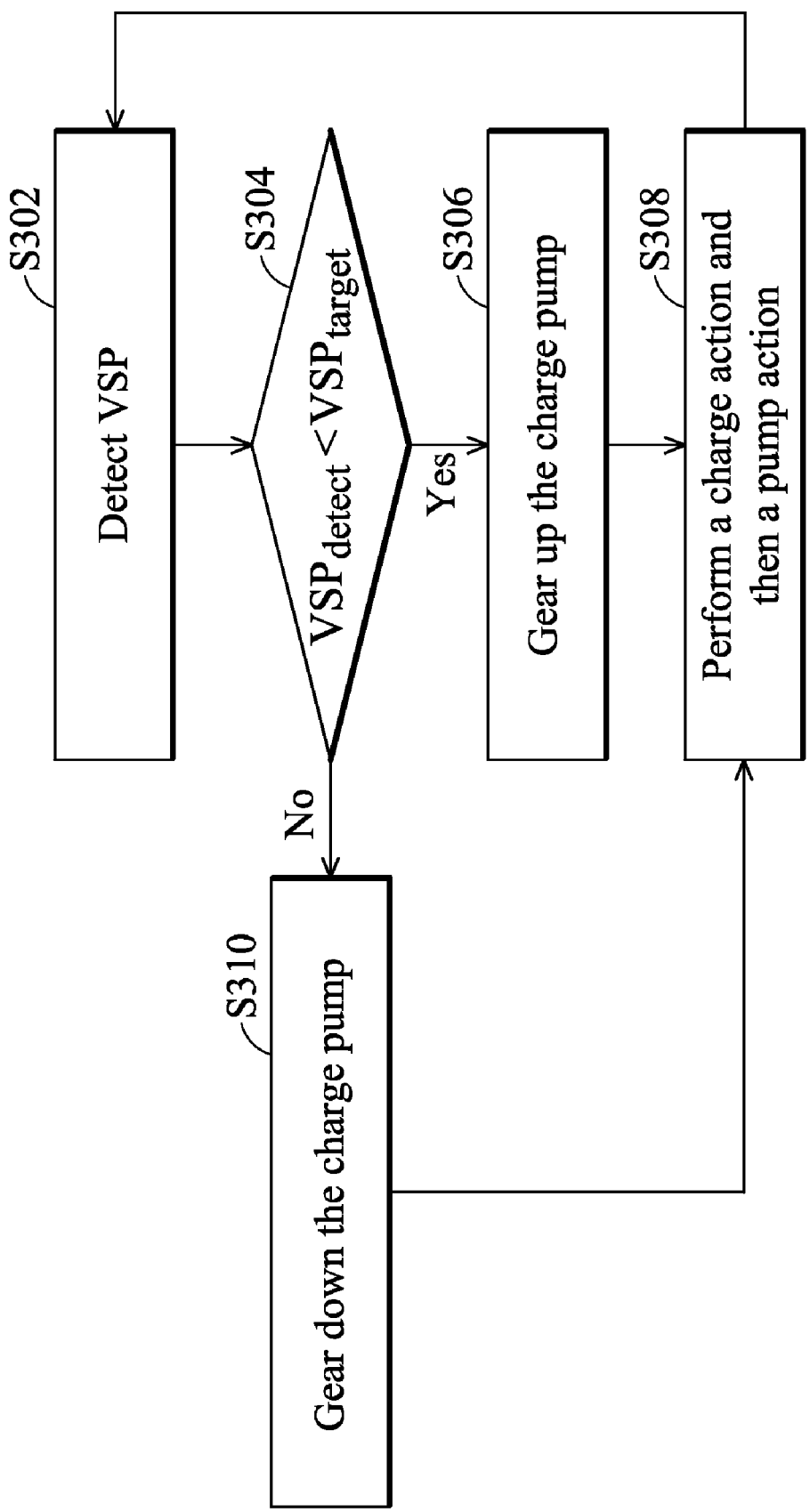

FIGS. 3A and 3B depict flowcharts depicting the operation of the voltage detector 202 and the charge pump controller 204. Referring to the embodiment depicted by the flowchart of FIG. 3A, step S302 actuates the voltage detector 202 to detect voltage value of the output terminal of the charge pump (VSP), and then step S304 actuates the charge pump controller 204 to compare the detected voltage value $VSP_{detect}$ and the target voltage value $VSP_{target}$. When the compared result is $VSP_{detect} < VSP_{target}$, the charge pump controller 204 performs step S306—gear up the charge pump—and then performs step S308 to perform a charge action (during the charge period) and then a pump action (during the pump period) on the capacitor $C_1$. As a result of the charge pump gearing up, the number of turning-on switches in the charge or pump period is increased, additional first switches $SW_{1,1} \ldots SW_{1,k}$ and additional second switches $SW_{2,1} \ldots SW_{2,l}$ are turned on in the charge period, and additional third switches $SW_{3,1} \ldots SW_{3,m}$ and additional fourth switches $SW_{4,1} \ldots SW_{4,n}$ are turned on in the pump period. On the contrary, when in step S304, the detected voltage value $VSP_{detect}$ reaches the target value $VSP_{target}$, step S308 may be directly performed to perform the charge and pump actions without changing the previous switch setting. After performing the charge and pump actions in step S308, step S302 is performed to repeat the loop.

The flowchart depicted in FIG. 3B further comprises step S310 in comparison with FIG. 3A. When in step S304, the detected voltage value $VSP_{detect}$ reaches the target value $VSP_{target}$, the charge pump controller 204 of FIG. 2 may perform step S310—gear down the charge pump—before performing step S308. As a result of the charge pump gearing down, the number of turning-on switches in the charge or pump period (in step S308) is decreased; compared with the switch setting of the previous loop, less of the first switches $SW_{1,1} \ldots SW_{1,k}$ and less of the second switches $SW_{2,1} \ldots SW_{2,l}$ are turned on in the charge period, and less of the third switches $SW_{3,1} \ldots SW_{3,m}$ and less of the fourth switches $SW_{4,1} \ldots SW_{4,n}$ are turned on in the pump period. The charge pump realized according to FIG. 3B provides gearing-up and gearing-down operations to dynamically adjust to the target value $VSP_{target}$.

Figure 4:
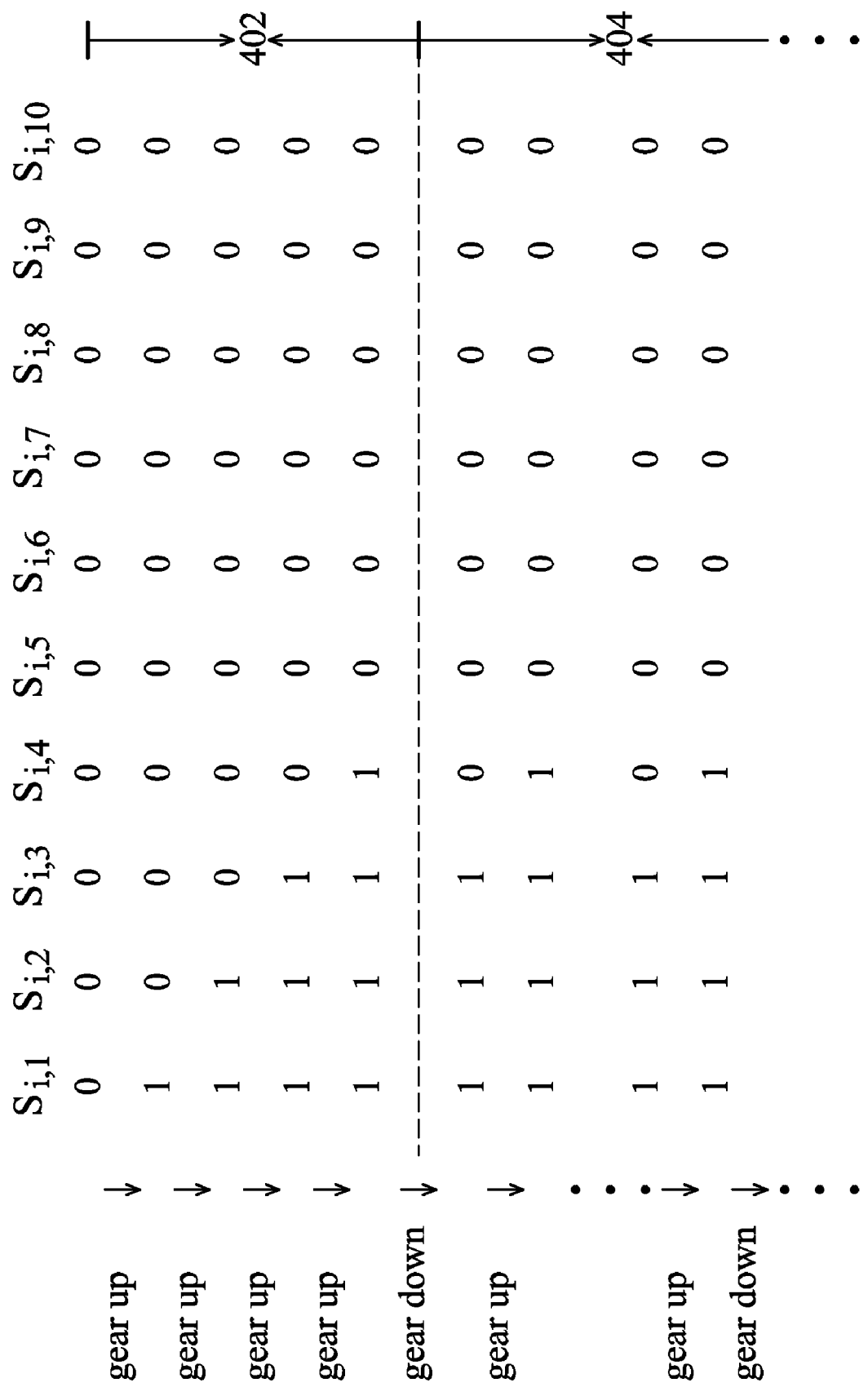
FIG. 4 depicts the enable/disable states of switches $S_{i,1} \ldots S_{i,10}$ of an exemplary of the charge pump 200, wherein each row relates to a charge/pump cycle.

This paragraph discusses an example of the charge pump 200 of FIG. 2. There are ten first switches, ten second switches, ten third switches and ten fourth switches. Thus, k=l=m=n=10, and the switches can be represented by $S_{i,1} \ldots S_{i,10}$, i=1 ... 4. Each row of FIG. 4 relates to a charge/pump cycle, wherein the enable/disable states of the switches $S_{i,1} \ldots S_{i,10}$ are depicted. The enable state is labeled by '1', which means that the corresponding switches are selected to be turned on in the charge or pump period. The disable state is labeled by '0', which means that the corresponding switches are not selected to be turned on in the charge or pump period. Label 402 marks charge/pump cycles for $VSP_{detect} < VSP_{target}$. As depicted, in region 402, the charge pump is gradually geared up, and the number of enabled switches is gradually increased in the charge/pump routines. After the detected voltage value $VSP_{detect}$ reaches the target voltage value $VSP_{target}$, the charge/pump cycles are marked by label 404. As depicted, in region 404, the charge pump is geared down or up according to the detected value $VSP_{detect}$; the number of the enabled switches is decreased/increased accordingly to oscillate the voltage value VSP around the target value $VSP_{target}$ within an acceptable range.

The charge pump of the invention is equipped with high application flexibility. When the target voltage $VSP_{target}$ is set to another value, the charge pump can automatically reach the new target value $VSP_{target}$ without redesigning the charge pump structure.

Furthermore, the gearing up/down design can determine the optimized switch setting for the target value $VSP_{target}$, thus, peak current is limited and power consumption is reduced.

In some exemplary embodiments of the charge pump 200 of the invention, the first and third reference voltages $V_1$ and $V_3$ are the same, labeled VCI, and the second reference voltage $V_2$ is ground, labeled VSSD. Thus, the generated voltage VSP may be $2*VCI - I_{load}*R_{total}$. $I_{load}$ represents a load current, and is dependent on the load coupled at the output terminal of the charge pump 200. $R_{total}$ represents the total resistance of the enabled switches.

Figure 5:
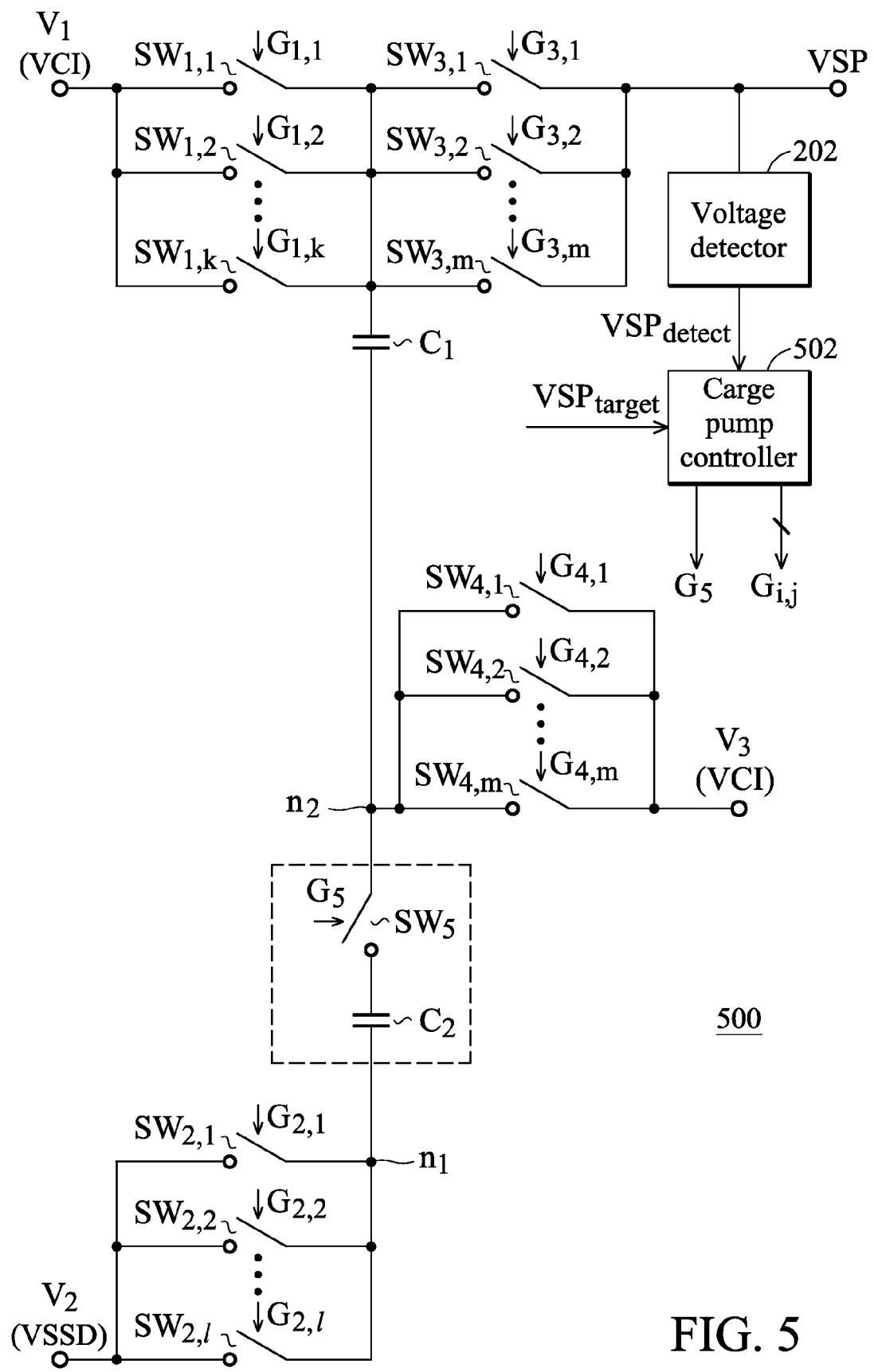
FIG. 5 depicts another exemplary embodiment of the charge pumps of the invention

FIG. 5 depicts another exemplary embodiment of the charge pumps of the invention. Compared with the charge pump 200 of FIG. 2, charge pump 500 further comprises a fifth switch $SW_5$ and a capacitor $C_2$ which are coupled in series between the first and second nodes $n_1$ and $n_2$. As depicted, the second node $n_2$ is closer to the second terminal of the capacitor $C_1$ in comparison with the first node $n_1$. Furthermore, compared with the charge pump controller 204 of FIG. 2, the charge pump controller 502 further provides a control signal $G_5$ controlling the fifth switch $SW_5$. The charge pump controller 502 turns on the fifth switch $SW_5$ in the charge period and turns off the fifth switch $SW_5$ in the pump period. In some exemplary embodiments, the first and third reference voltages $V_1$ and $V_3$ are the same, labeled VCI, and the second reference voltage $V_2$ is ground, labeled VSSD. Thus, the generated voltage VSP may be $1.5*VCI - I_{load}*R_{drop}$. $I_{load}$ represents a load current, and is dependent on the load coupled at the output terminal of the charge pump 500. Resistance $R_{drop}$ is dependent on the resistance of the enabled switches.

Figure 6:
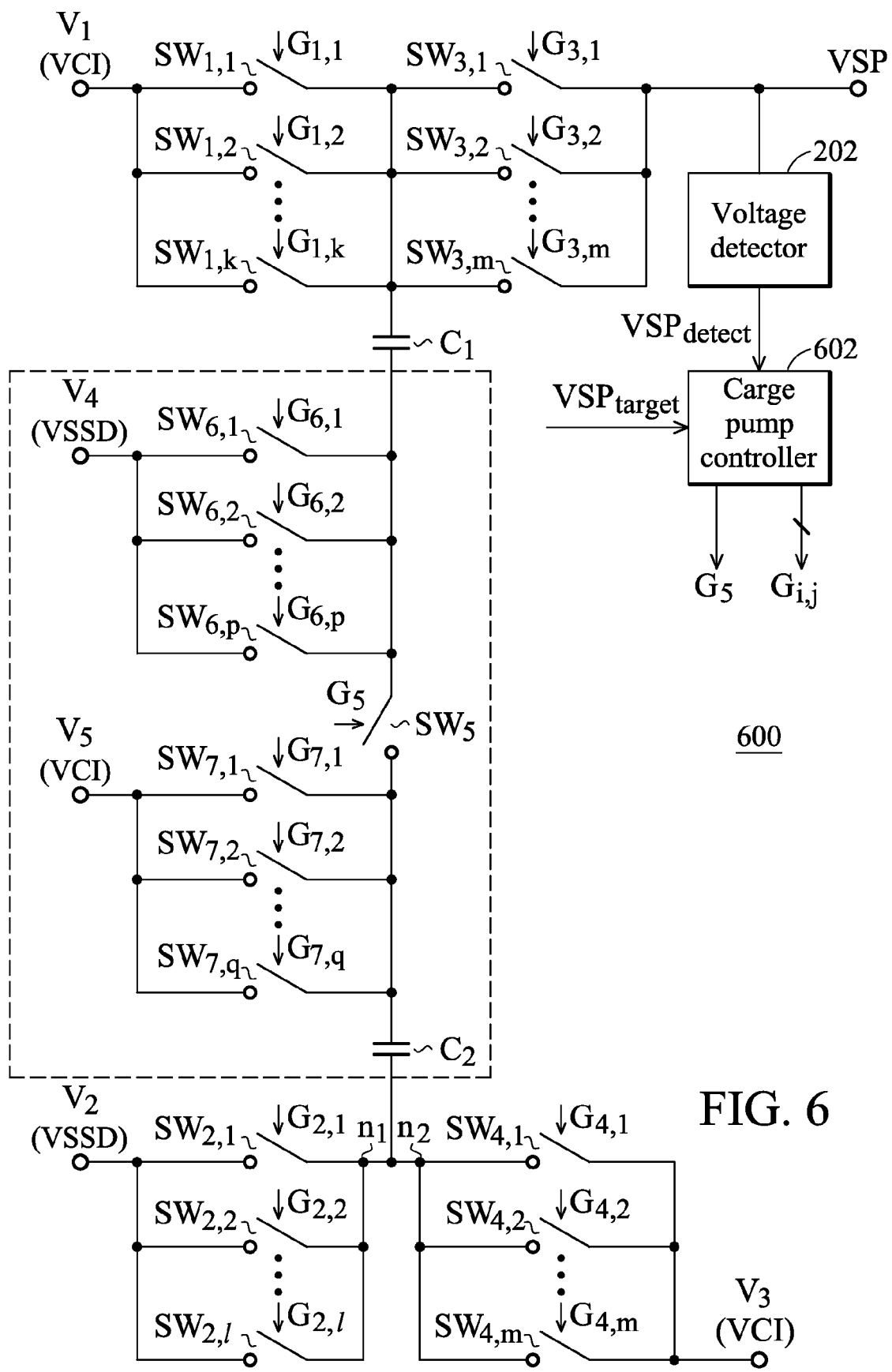
FIG. 6 depicts another exemplary embodiment of the charge pumps of the invention.

FIG. 6 depicts another exemplary embodiment of the charge pumps of the invention. Compared with the charge pump 200 of FIG. 2, charge pump 600 further comprises a fifth switch $SW_5$, a capacitor $C_2$, a plurality of sixth switches $SW_{6,1} \ldots SW_{6,p}$ and a plurality of seventh switches $SW_{7,1} \ldots SW_{7,q}$. The fifth switch $SW_5$ and the capacitor $C_2$ are coupled in series between the capacitor $C_1$ and the directly connected first and second nodes $n_1$ and $n_2$. As depicted, the fifth switch $SW_5$ has a first terminal coupled to the capacitor $C_1$ and has a second terminal coupled to the capacitor $C_2$. The sixth switches $SW_{6,1} \ldots SW_{6,p}$ are coupled in parallel between a fourth reference voltage $V_4$ and the first terminal of the fifth switch $SW_5$. The seventh switches $SW_{7,1} \ldots SW_{7,q}$ are coupled in parallel between a fifth reference voltage $V_5$ and the second terminal of the fifth switch $SW_5$.

The charge pump controller 602 further controls the fifth switch $SW_5$, the sixth switches $SW_{6,1} \ldots SW_{6,p}$ and the seventh switches $SW_{7,1} \ldots SW_{7,q}$ in comparison with the charge pump controller 204. During the charge period, in addition to turning off all third and fourth switches $SW_{3,1} \ldots SW_{3,m}$ and $SW_{4,1} \ldots SW_{4,n}$ and selectively turning on the first and second switches $SW_{1,1} \ldots SW_{1,k}$ and $SW_{2,1} \ldots SW_{2,l}$ according to the detected voltage value $VSP_{detect}$, the charge pump controller 602 also turns off the fifth switch $SW_5$, and selectively turns on the sixth and seventh switches $SW_{6,1} \ldots SW_{6,p}$ and $SW_{7,1} \ldots SW_{7,q}$ according to the detected voltage value $VSP_{detect}$. Thus, the capacitor $C_1$ is charged by the first and fourth reference voltages $V_1$ and $V_4$ (via a first charge path provided by the selected first and sixth switches), and the capacitor $C_2$ is charged by the fifth and second reference voltages $V_5$ and $V_2$ (via a second charge path provided by the selected seventh and second switches). During the pump period, in addition to turning off all first and second switches $SW_{1,1} \ldots SW_{1,k}$ and $SW_{2,1} \ldots SW_{2,l}$ and selectively turning on the third and fourth switches $SW_{3,1} \ldots SW_{3,m}$ and $SW_{4,1} \ldots SW_{4,n}$ according to the detected voltage value $VSP_{detect}$, the charge pump controller 602 also turns on the fifth switch $SW_5$ and turns off all sixth and seventh switches $SW_{6,1} \ldots SW_{6,p}$ and $SW_{7,1} \ldots SW_{7,q}$. Thus, the output terminal is pumped by the third reference voltage $V_3$ and the voltage level stored in the capacitors $C_1$ and $C_2$. The charge pump controller 602 may increase the number of turning-on switches in the first charge path or the second charge path or the pump path when the detected voltage value $VSP_{detect}$ is lower than the target value $VSP_{target}$, and may decrease the number of turning-on switches in the first or second charge path or the pump path when the detected voltage value $VSP_{detect}$ reaches the target value $VSP_{target}$.

In some exemplary embodiments of the charge pump 600, the first, third and fifth reference voltages $V_1$, $V_3$ and $V_5$ are the same, labeled VCI, and the second and fourth reference voltages $V_2$ and $V_4$ are ground, labeled VSSD. Thus, the voltage VSP may be $3*VCI-I_{load}*R_{drop}$. $I_{load}$ represents a load current, and is dependent on the load coupled at the charge pump. Resistance $R_{drop}$ is dependent on the resistance of the enabled switches.

Figure 7:
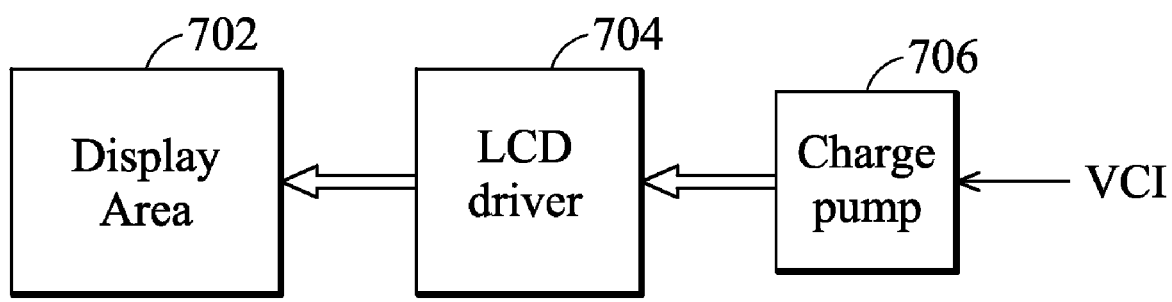
FIG. 7 depicts an LCD of the invention.

The aforementioned charge pumps may be used in liquid crystal displays (LCDs) as depicted in FIG. 7. LCD 700 comprises a display area 702, an LCD driver 704 and a charge pump 706. The LCD driver 704 is designed to drive the display area 702 and the voltage references of the LCD driver 704 are provided by the charge pump 706. The charge pump 706 is fed a reference voltage VCI to generate the voltage references for the LCD driver 704, and is realized based on the techniques disclosed in the above discussion. The LCD driver 704 may be fabricated on the glass substrate of the display area 702 or may be fabricated as a chip outside the glass substrate of the display area 702. Similarly, the components of the charge pump 706 are not limited to be fabricated on the glass substrate of the display area 702. For example, the switched-capacitor circuit of the charge pump 706 may be fabricated separate from the glass substrate.

Furthermore, the switches mentioned in the invention are not limited to having a unified size and may have different sizes.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charge pump, comprising:
   an output terminal;
   a first capacitor, having a first terminal and a second terminal;
   a plurality of first switches, coupled in parallel between a first reference voltage and the first terminal of the first capacitor;
   a plurality of second switches, coupled in parallel between a second reference voltage and a first node that is coupled to the second terminal of the first capacitor;
   a plurality of third switches, coupled in parallel between the first terminal of the first capacitor and the output terminal;
   a plurality of fourth switches, coupled in parallel between a third reference voltage and a second node that is coupled to the second terminal of the first capacitor;
   a voltage detector, detecting voltage value of the output terminal; and
   a charge pump controller, controlling the first, second, third and fourth switches,
   wherein, in a charge period, the charge pump controller selectively turns on the first and second switches according to the detected voltage value of the output terminal and turns off all third and fourth switches and, in a pump period, the charge pump controller selectively turns on the third and fourth switches according to the detected voltage value of the output terminal and turns off all first and second switches.

2. The charge pump as claimed in claim 1, wherein the charge pump controller increases the number of turning-on switches when the detected voltage value of the output terminal is lower than a target value.

3. The charge pump as claimed in claim 2, wherein the charge pump controller decreases the number of turning-on switches when the detected voltage value of the output terminal is greater than the target value.

4. The charge pump as claimed in claim 2, wherein the first and third reference voltages are the same, and the second reference voltage is ground.

5. The charge pump as claimed in claim 2, further comprising:
   a fifth switch and a second capacitor, coupled in series between the first and second nodes,
   wherein the second node is closer to the second terminal of the first capacitor in comparison with the first node, and
   wherein the charge pump controller further controls the fifth switch and turns on the fifth switch in the charge period and turns off the fifth switch in the pump period.

6. The charge pump as claimed in claim 5, wherein the charge pump controller decreases the number of turning-on switches when the detected voltage value of the output terminal is greater than the target value.

7. The charge pump as claimed in claim 6, wherein the first and third reference voltages are the same, and the second reference voltage is ground.

8. The charge pump as claimed in claim 2, further comprising:
   a fifth switch and a second capacitor coupled in series between the first capacitor and the directly connected first and second nodes, wherein the fifth switch has a first terminal coupled to the second node of the first capacitor and has a second terminal coupled to the second capacitor to couple to the directly connected first and second nodes;

a plurality of sixth switches, coupled in parallel between a fourth reference voltage and the first terminal of the fifth switch; and a plurality of seventh switches, coupled in parallel between a fifth reference voltage and the second terminal of the fifth switch, wherein the charge pump controller further controls the fifth switch, the sixth switches and the seventh switches, and wherein, in the charge period, the charge pump controller selectively turns on the sixth and seventh switches according to the detected voltage value of the output terminal and turns off the fifth switch and, in the pump period, the charge pump controller turns on the fifth switch and turns off all sixth and seventh switches.

9. The charge pump as claimed in claim 8, wherein the charge pump controller decreases the number of turning-on switches when the detected voltage value of the output terminal is greater than the target value.

10. The charge pump as claimed in claim 8, wherein the first, third and fifth reference voltages are the same, and the second and fourth reference voltages are ground.

11. A liquid crystal display (LCD), comprising:
a display area; and
a charge pump, outputting a positive voltage for driving the display area, comprising:
an output terminal, providing the positive voltage;
a first capacitor, having a first terminal and a second terminal;
a plurality of first switches, coupled in parallel between a first reference voltage and the first terminal of the first capacitor;
a plurality of second switches, coupled in parallel between a second reference voltage and a first node that is coupled to the second terminal of the first capacitor;
a plurality of third switches, coupled in parallel between the first terminal of the first capacitor and the output terminal;
a plurality of fourth switches, coupled in parallel between a third reference voltage and a second node that is coupled to the second terminal of the first capacitor;
a voltage detector, detecting voltage value of the output terminal; and
a charge pump controller, controlling the first, second, third and fourth switches,
wherein, in a charge period, the charge pump controller selectively turns on the first and second switches according to the detected voltage value of the output terminal and turns off all third and fourth switches and, in a pump period, the charge pump controller selectively turns on the third and fourth switches according to the detected voltage value of the output terminal and turns off all first and second switches.

12. The LCD as claimed in claim 11, wherein the charge pump controller increases the number of turning-on switches when the detected voltage value of the output terminal is lower than a target value.

13. The LCD as claimed in claim 12, wherein the charge pump controller decreases the number of turning-on switches when the detected voltage value of the output terminal is greater than the target value.

14. The LCD as claimed in claim 12, wherein the first and third reference voltages are the same, and the second reference voltage is ground.

15. The charge pump as claimed in claim 12, further comprising:
a fifth switch and a second capacitor, coupled in series between the first and second nodes,
wherein the second node is closer to the second terminal of the first capacitor in comparison with the first node, and
wherein the charge pump controller further controls the fifth switch, and turns on the fifth switch in the charge period and turns off the fifth switch in the pump period.

16. The LCD as claimed in claim 15, wherein the charge pump controller decreases the number of turning-on switches when the detected voltage value of the output terminal is greater than the target value.

17. The LCD as claimed in claim 16, wherein the first and third reference voltages are the same, and the second reference voltage is ground.

18. The LCD as claimed in claim 12, further comprising:
a fifth switch and a second capacitor coupled in series between the first capacitor and the directly connected first and second nodes, wherein the fifth switch has a first terminal coupled to the second node of the first capacitor and a second terminal coupled to the second capacitor to couple to the directly connected first and second nodes;
a plurality of sixth switches, coupled in parallel between a fourth reference voltage and the first terminal of the fifth switch; and
a plurality of seventh switches, coupled in parallel between a fifth reference voltage and the second terminal of the fifth switch,
wherein the charge pump controller further controls the fifth switch, the sixth switches and the seventh switches, and
wherein, in the charge period, the charge pump controller selectively turns on the sixth and seventh switches according to the detected voltage value of the output terminal and turns off the fifth switch and, in the pump period, the charge pump controller turns on the fifth switch and turns off all sixth and seventh switches.

19. The LCD as claimed in claim 18, wherein the charge pump controller decreases the number of turning-on switches when the detected voltage value of the output terminal is greater than the target value.

20. The LCD as claimed in claim 18, wherein the first, third and fifth reference voltages are the same, and the second and fourth reference voltages are ground.

* * * * *